(12) United States Patent  (10) Patent No.: US 9,031,621 B2
Cheng et al.  (45) Date of Patent: May 12, 2015

(54) SUPPORT STRUCTURE FOR ELECTRONIC DEVICE

(75) Inventors: Quan-Chang Cheng, Shenzhen (CN); Chia-Te Yu, New Taipei (TW); Lin-Lin Pan, Shenzhen (CN); Cong-Bing Zhou, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 943 days.

(21) Appl. No.: 13/170,337

(22) Filed: Jun. 28, 2011

(65) Prior Publication Data

US 2012/0162102 A1  Jun. 28, 2012

(30) Foreign Application Priority Data

Dec. 23, 2010  (CN) .......................... 2010 1 0602342

(51) Int. Cl.
*H04M 1/00* (2006.01)
*F16M 13/00* (2006.01)
*F16M 11/04* (2006.01)
*F16M 11/10* (2006.01)
*G06F 1/16* (2006.01)

(52) U.S. Cl.
CPC ............. *F16M 13/00* (2013.01); *F16M 11/041* (2013.01); *F16M 11/10* (2013.01); *G06F 1/166* (2013.01)

(58) Field of Classification Search
CPC . G06F 1/1616; H04M 1/0214; H04M 1/0216; H04M 1/0237
USPC ............ 455/575.1, 575.3, 575.4; 361/679.01; 248/284.1
See application file for complete search history.

(56) References Cited

U.S. PATENT DOCUMENTS

| 6,840,791 B2 * | 1/2005 | Hsiu ............................. 439/374 |
| 7,556,570 B2 * | 7/2009 | Thormer ....................... 473/259 |
| 8,033,516 B2 * | 10/2011 | Luijben et al. ............. 248/284.1 |
| 2009/0321609 A1 * | 12/2009 | Wang et al. ................... 248/685 |
| 2010/0014229 A1 * | 1/2010 | Horie ....................... 361/679.01 |
| 2010/0159997 A1 * | 6/2010 | Wang ............................ 455/566 |

FOREIGN PATENT DOCUMENTS

CN  201440668 U  4/2010

* cited by examiner

*Primary Examiner* — Danh Le
(74) *Attorney, Agent, or Firm* — Novak Druce Connolly Bove + Quigg LLP

(57) ABSTRACT

A support structure is used for supporting an electronic device. The support structure includes a main body sleeved on a side portion of the electronic device and a supporting member rotatably connected to the main body. The supporting member can rotate relative to the main body to form an included angle for supporting the electronic device.

20 Claims, 6 Drawing Sheets

SUPPORT STRUCTURE FOR ELECTRONIC DEVICE

BACKGROUND

1. Technical Field

The present disclosure relates to support structures, and particularly to a support structure for supporting an electronic device.

2. Description of Related Art

Many hand held electronic devices, such as mobile phones or personal digital assistances, are now commonly used. When a user uses these devices, they often need to hold the electronic device with one hand and operate the electronic device with the other hand, having both hands occupied may be an inconvenience for some users. Sometimes, the users will put the electronic device on a desk when using the electronic device. However, the electronic device contacts the desk directly, and may get dirty or scratched. Moreover, the user may have to view the display of the electronic device from directly overhead.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
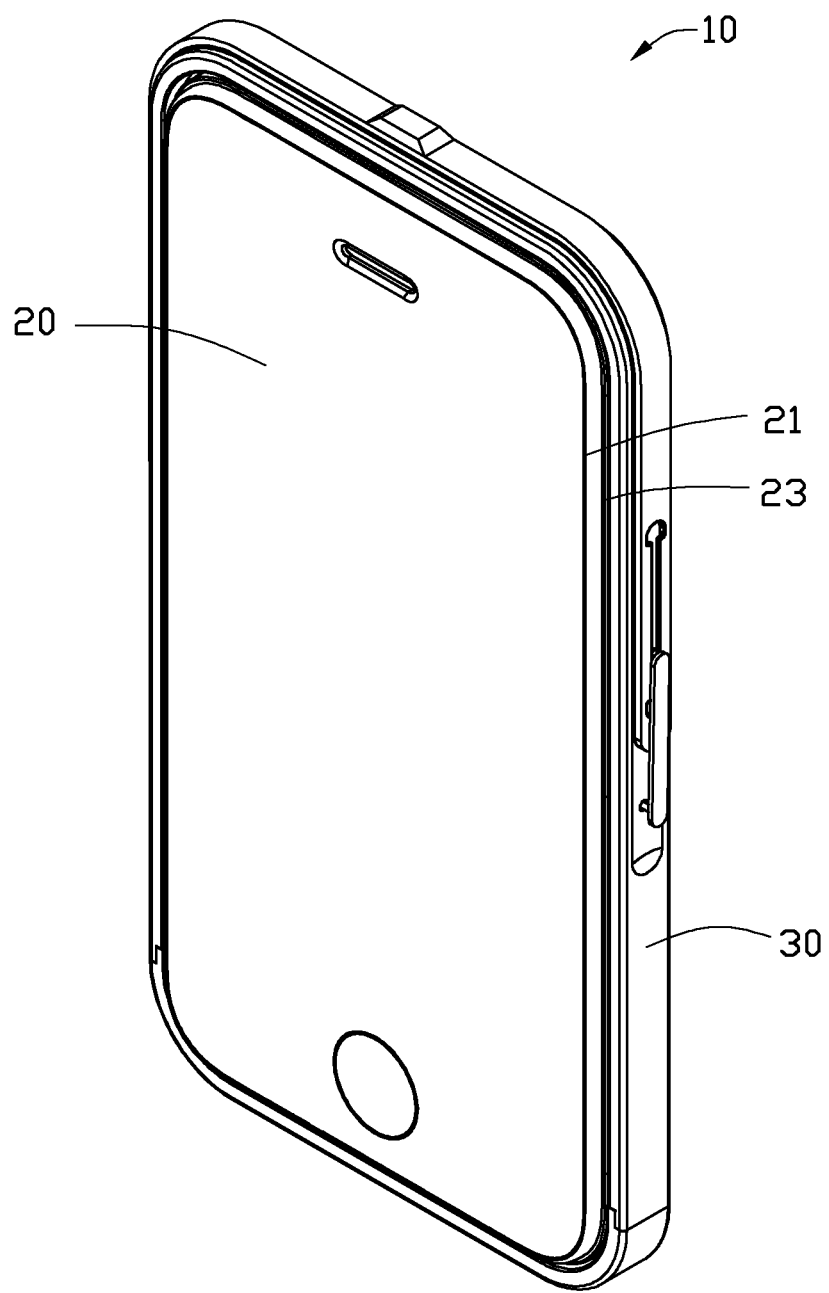
FIG. 1 is a schematic view of a support structure according to a first embodiment of the present disclosure connected to an electronic device, with the support structure being in a close state.

Referring to FIG. 1, an electronic apparatus 10 includes an electronic device 20 and a support structure 30 connected to the electronic device 20 for supporting the electronic device 20. The electronic device 20 in some embodiments may be hand held electronic devices such as a mobile phone, a music player, or a tablet computer. In an illustrated embodiment, the electronic device 20 is a mobile phone and has a display 21, a back (not labeled) opposite to the display 21, and a side portion 23 connecting the display 21 and the back. In the illustrated embodiment, the electronic device 20 may include jacks or dock connectors (not shown) corresponding to control functions of the electronic device 20 arranged on the side portion 23. The support structure 30 supports the electronic device 20, so the electronic device 20 can stand upright on a flat surface to offer a good viewing angle of the display 21 to users, as shown in FIG. 2.

Figure 2:
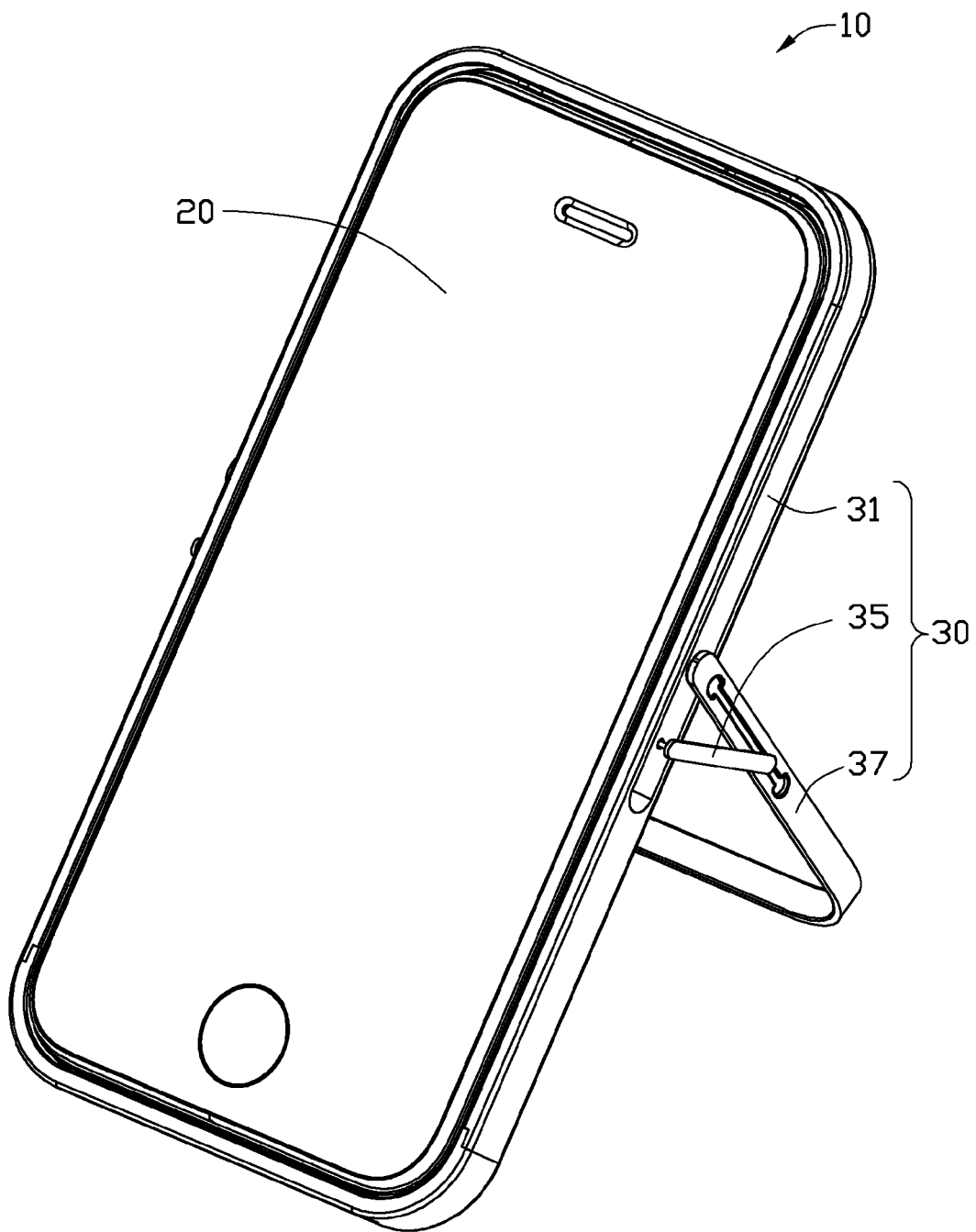
FIG. 2 is similar to FIG. 1 with the support structure in an open state.

Referring to FIG. 2, the support structure 30 includes a main body 31 sleeved on the side portion 23 of the electronic device 20, a supporting member 37 connected to the main body 31 for supporting the electronic device 20, and two connection members 35 connecting the supporting member 37 and the main body 31. In the illustrated embodiment, the main body 31 is made of elastic material for being securely sleeved on the side portion 23 and protecting the side portion 23. The supporting member 37 is connected to the main body 31 and can rotate relative to the main body 31 to be in an open state as shown in FIG. 2 and in a closed state shown in FIG. 1. The connection member 35 is connected to the main body 31 and the supporting member 37. The connection member 35 also can rotate relative to the main body 31. When the supporting member 37 is in the open state shown in FIG. 2, the main body 31, the connection member 35, and the supporting member 37 form a triangle, allowing the electronic device 20 to stably stand upright on a flat surface.

Figure 3:
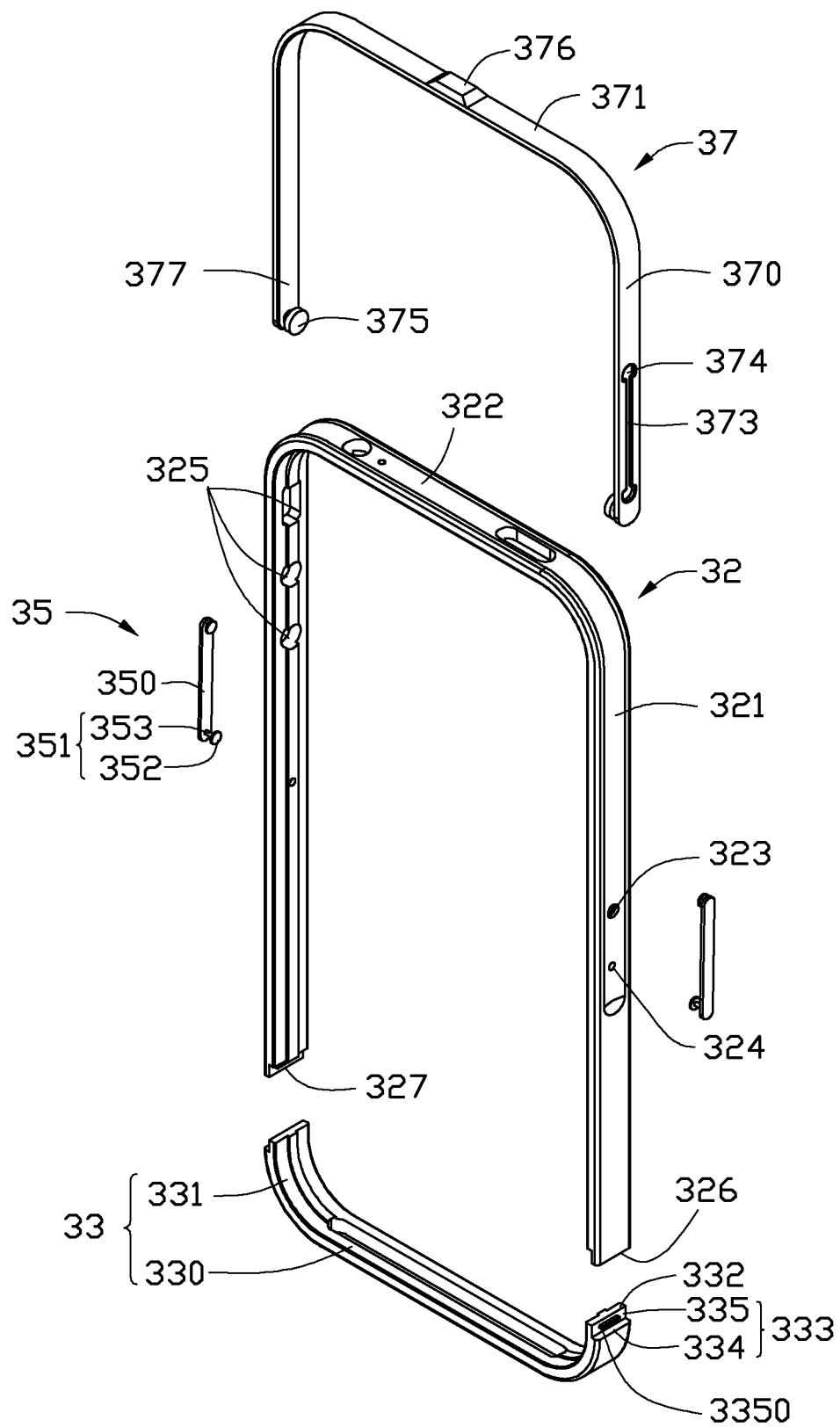
FIG. 3 is an exploded view of the support structure of FIG. 1, with a first engaging portion included.
Figure 4:
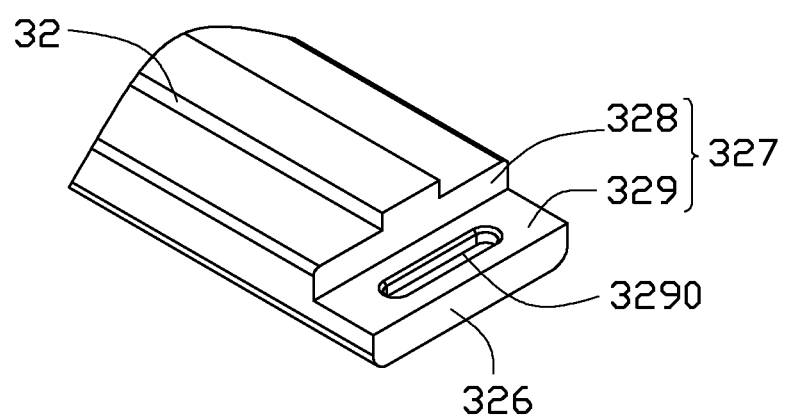
FIG. 4 is a schematic view showing the first engaging portion of FIG. 3.

Referring to FIG. 3, the main body 31 includes a first body portion 32 and a second body portion 33 detachably engaged with the first body portion 32. The first body portion 32 is substantially U shaped. An outer surface of the first body portion 32 is recessed to form a recess 321. The recess 321 includes a wall 322. Two connection slots 323 are respectively defined in the wall 322 and face away from each other. Two connection holes 324 are also defined in the bottom wall 322 and are respectively adjacent to the connection slots 323. The wall 322 further defines three functional holes 325 corresponding to jacks or dock connectors arranged on the side portion 23 of the electronic device 20. Two distal end surfaces 326 of the first body portion 32 are respectively cut to form two first engaging portions 327 facing opposite to each other. Referring also to FIG. 4, each first engaging portion 327 includes two side walls 328 and 329. A slot 3290 is defined in each side wall 329.

Referring to FIG. 3 again, the second body portion 33 is also substantially U shaped. The second body portion 33 includes a first engaging arm 330 and two second engaging arms 331 connected to the first engaging arm 330 respectively. Distal end surfaces 332 of the second engaging arms 331 are respectively cut to form two second engaging portions 333 respectively corresponding to the two first engaging portions 327 of the first body portion 32. The second engaging portions 333 face away from each other and respectively correspond to the first engaging portions 327. Each second engaging portion 333 includes two side walls 334 and 335. A protrusion 3350 protrudes from the wall 335 of each second engaging portion 333 for being received in the corresponding slot 3290 (see FIG. 4).

Each connection member 35 includes a main part 350 connected to both the first body portion 32 and the supporting member 37, and two connection portions 351 disposed at two opposite ends of the main part 350. Each connection portion 351 includes a head 352 and a rod 353 disposed between the main part 350 and the head 352. In the illustrated embodiment, both the cross-section of the head 352 and the rod 353 are circular, and the radius of the head 352 is larger than that of the rod 353.

The supporting member 37 is also substantially U shaped and can be received in the recess 321 of the first body portion 32. The supporting member 37 includes two parallel first connection arms 370, a second connection arm 371 connecting the two first connection arms 370, two rotating rods 375 protruding from the first connection arms 370 respectively, and a touching portion 376 protruding from the second connection arm 371. The first connection arms 370 are parallel to each other. A sliding track 373 and two entrances 374 are defined in an outer surface of each connection arm 370 and the entrances 374 are located at two opposite ends of the sliding track 373 communicating with the sliding track 373. Each sliding track 373 is shaped according to the connection portions 351 of each connection member 35 to allow the corresponding connection portion 351 to slide backward and forward therein. The entrances 374 correspond to the head 352 of the connection portion 351 to allow the head 352 to be inserted into the sliding track 373. The rotating rods 375 respectively protrude from the end portions 377 of the first connection arms 370 and face each other. The rotating rods 375 correspond to the connection slots 323 of the first body portion 32 and can rotate in the connection slots 323 to rotate the first and second connection arms 370, 371. The touching portion 376 protrudes from an outer surface of the second connection arm 371 to allow touching by the users so the supporting member 37 can move out of the recess 321 of the first body portion 32.

In assembly, the first body portion 32 is securely clipped onto the side portion 23 of the electronic device 20. The second body portion 33 is connected to the first body portion 32, and the first engaging portions 327 respectively engage with the second engaging portions 333. The wall 328 of each first engaging portion 327 contacts a distal end surface 332 of each second engaging arm 331 of the second body portion 33. Meanwhile, the wall 329 of each first engaging portion 327 contacts the wall 335 of the corresponding second engaging portion 333, and the protrusion 3350 of each second engaging portion 333 is received in the slot 3290 of the corresponding first engaging portion 327. The second body portion 33 is connected to the first body portion 32. The rotating rods 375 are respectively received in the connection slots 323 to connect the supporting member 37 to the first body portion 32. The head 352 of one connection portion 351 of each connection member 35 is clipped into one entrance 374 and into the sliding track 373 of the supporting member 37, while the head 352 of the other connection portion 351 thereof is clipped into the corresponding connection hole 324 of the first body portion 32. Thus, the connection members 35 are connected to the main body 31 and the supporting member 37.

As shown in FIG. 1, in use, the supporting member 37 can be kept in a closed state in which the supporting member 37 is received in the recess 321 of the first body portion 32. At this time, the supporting member 37 covers the functional holes 325 defined in the main body 31. Therefore, dust contamination getting in the functional holes 325 can be minimized. Also, the main parts 350 of the connection members 35 at this time are respectively parallel to the first connection arms 370, therefore, the volume of the support structure 30 is reduced to be the minimized state and users can hold the electronic device 20 in hand conveniently and easily.

Referring again to FIG. 2, when a force is applied to the touching portion 376, the supporting member 37 is driven out of the recess 321 and rotates relative to the first body portion 32 to be in an open state. An included angle between the main body 31 and the supporting member 37 is formed. Meanwhile, each connection portion 351 is driven to slide in the corresponding sliding track 373. Therefore, a triangle is formed between the main body 31, the connection member 35, and the supporting member 37. The electronic device 20 then can be put on a flat surface, such as a desk and stably stand upright on the flat surface. Therefore, users can view the electronic device 20 in a desired viewing angle or operate the electronic device 20 without holding the electronic device 20.

It should be noted that when the supporting member 37 is in the open state, the supporting member 37 does not cover the main body 31. Therefore, the functional holes 325 corresponding to jacks or dock connectors of the electronic device retain accessibility for users. In addition, since the main body 31 is only clipped on the side portion 23 of the electronic device 20, the display 21, which may be a display of the electronic device 20 is also totally viewable by users.

Figure 5:
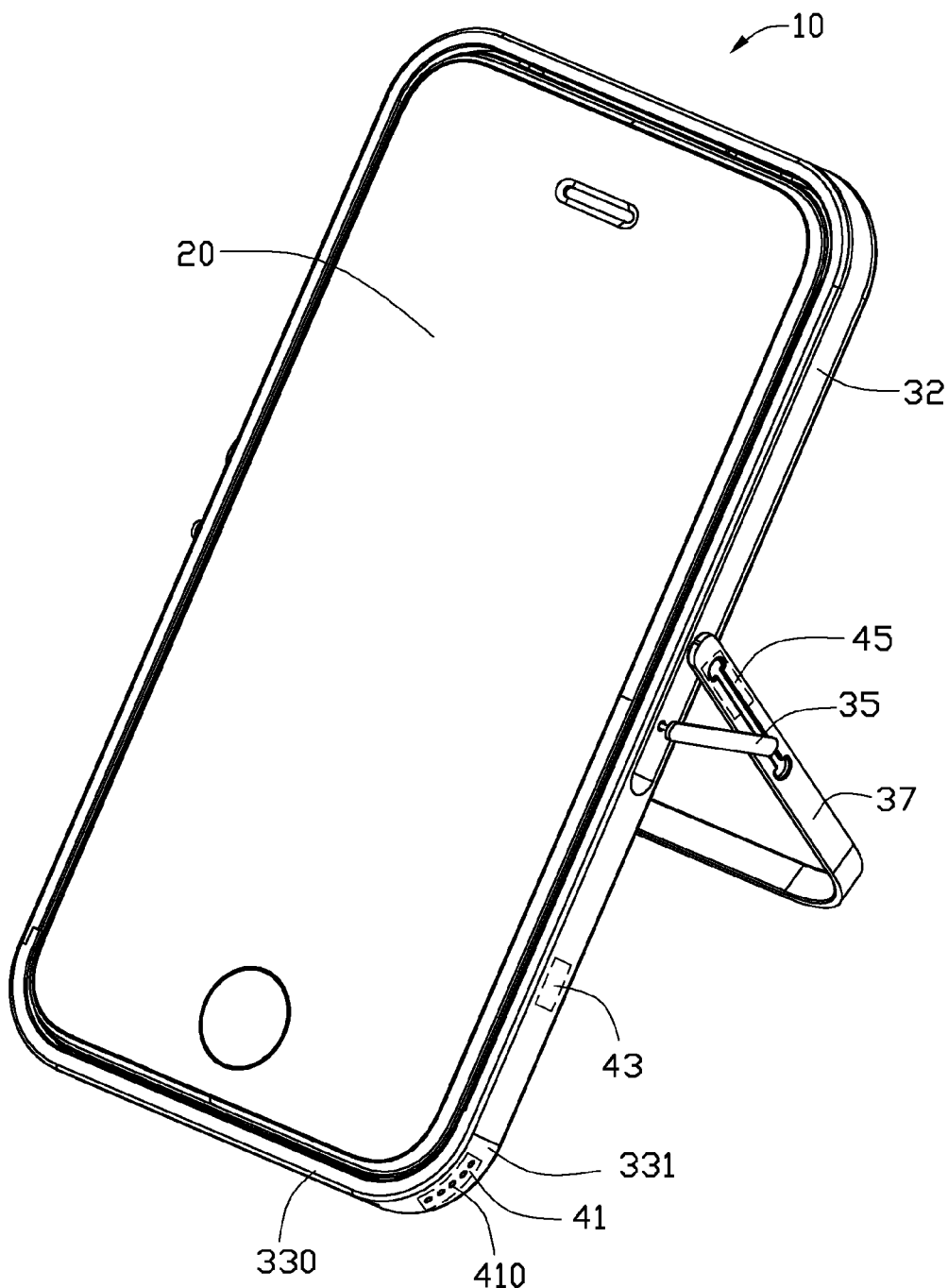
FIG. 5 is a schematic view of a support structure according to a second embodiment of the present disclosure, with an auto-control module included.
Figure 6:
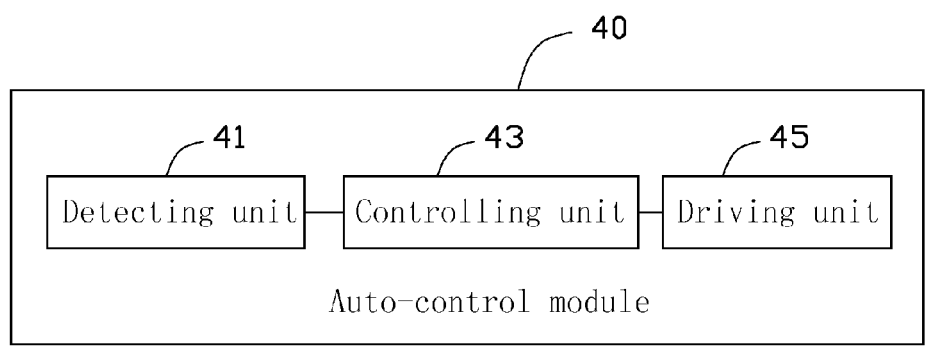
FIG. 6 is a functional block diagram of the auto-control module of FIG. 6.

Referring to FIGS. 5 and 6, in a second embodiment, the support structure 30 further includes an auto-control module 40 for automatically rotating the supporting member 37 relative to the main body 31. The auto-control module 40 includes a detecting unit 41, a controlling unit 43, and a driving unit 45. The detecting unit 41 is disposed in one second engaging arm 331 of the second body portion 33 for generating different detecting signals according to a touch of the user. The detecting unit 41 includes a plurality of detecting ports 410 arranged in a certain order to detect the touch of the user. For example, the detecting ports 410 are arranged in an order from the second engaging portion 333 to the second engaging arm 331. When a user moves a finger on the second engaging arm 331 to touch different detecting ports 410, the detecting unit 41 generates a detecting signal according to one detecting port 410 touched by users. For example, when the user touches one detecting port 410, which is nearest to the second engaging portion 333, the detecting unit 41 generates a first detecting signal, when the user touches the detecting port 410 which is second nearest to the second engaging portion 333, the detecting unit 41 generates a second detecting signal.

The controlling unit 43 is disposed in the first body portion 32 for determining the relationship between the order of the detecting signals and the order of the detecting ports 410 and generates control signals according to the relationship. For example, when the touch extends from the second engaging portion 333 to the second engaging arm 331, the touch is consistent with the order in which the detecting ports 410 are arranged. Therefore, the controlling unit 43 generates a first control signal. When the touch is contrary to the order in which the detecting ports 410 are arranged, the controlling unit 43 generates a second control signal.

The driving unit 45 is disposed in the supporting member 37 for driving the supporting member 37 to rotate relative to main body 31 according to the control signals. For example, the driving unit 45 drives the rotating rod 375 to rotate clockwise in the corresponding connection slot 323 when receiving the first control signal. Therefore, the supporting member 37 is driven to move out from the recess 321 and rotate clockwise relative to the main body 31 to be in the open state. When receiving the second control signal, the driving unit 45 drives the rotating rod 375 to rotate counterclockwise in the corresponding connection slot 323 to drive the supporting member 37 to be in the closed state.

It should be understood that in other embodiments the driving unit 45 may drive the supporting member 37 to rotate clockwise when receiving the second control signal and drive the supporting member 37 to rotate counterclockwise when receiving the first control signal.

With the support structure 30, the electronic device 20 can stably stand upright on a flat surface, and users thus can use the electronic device 20 without holding the electronic device 20. Users can adjust the included angle between the supporting member 37 and the electronic device 20 by applying force to the touching portion 376 or by touching the second engaging arms 331. Additionally, the main body 31 covers side portion 23 of the electronic device 20, thereby somewhat avoiding dust contamination to the electronic device 20.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A support structure used for supporting an electronic device, the support structure comprising:
   a main body sleeved on a side portion of the electronic device; and
   a supporting member rotatably connected to the main body and being rotatable relative to the main body to form an included angle therebetween to support the electronic device;
   wherein the support structure further comprises at least one connection member; the main body defines a recess for accommodating the supporting member; the at least one connection member driven by the supporting member cooperates with the supporting member for locating the included angle, and is rotatably fixed in the recess where the supporting member is rotatably received.

2. The support structure as claimed in claim 1, wherein the main body is frame shaped and corresponds to the side portion of the electronic device.

3. The support structure as claimed in claim 2, wherein the main body comprises a first body portion and a second body portion detachably connected to the first body portion.

4. The support structure as claimed in claim 3, wherein the first body portion comprises two first distal ends each of which defines a slot, the second body portion comprises two second distal ends corresponding to the first distal ends respectively, and two protrusions protrude from the second distal ends to be respectively received in the slots to connect the second body portion to the first body portion.

5. The support structure as claimed in claim 2, wherein the recess is defined in the first body portion.

6. The support structure as claimed in claim 1, wherein the recess defines two connection slots facing away from each other, the supporting member further comprises two opposite rotating rods respectively received in the connection slots, and the supporting member can rotate relative to the main body as the rotating rods rotate in the connection slots respectively.

7. The support structure as claimed in claim 6, wherein the support structure further comprises an auto-control module used for automatically driving the supporting member to rotate relative to the main body.

8. The support structure as claimed in claim 7, wherein the auto-control module comprises a detecting unit disposed in the main body for detecting a touch from a user, a controlling unit disposed in the main body for generating different control signals according to the touch, and a driving unit disposed in the supporting member for driving the rotating rods to rotate in the connection slots respectively.

9. The support structure as claimed in claim 8, wherein the detecting unit comprises a plurality of detecting ports arranged in order, when each detecting port is touched, the detecting unit generates a corresponding detecting signal, and the controlling unit generates different control signals according to the relationship between the order of the detecting signals and the order that the detecting ports are arranged.

10. The support structure as claimed in claim 9, wherein when the order of the detecting signals is consistent with the order that the detecting ports are arranged, the controlling unit generates a first control signal, the driving unit receives the first control signal and drives the rotating rods to rotate in the connection slots along a first direction to open the supporting member; and when the order of the detecting signals is inconsistent with the order that the detecting ports are arranged, the controlling unit generates a second control signal, the rotating rods receives the second control signal and drives the rotating rods to rotate in the connection slots along a second direction opposite to the first direction to close the supporting member.

11. The support structure as claimed in claim 1, wherein each connection member comprises a main part and two connection portions disposed on one side of the main part, the recess defines a connection hole for one connection portion to rotate therein, and the supporting member defines a sliding track for the other connection portion to slide therein.

12. The support structure as claimed in claim 11, wherein the supporting member further defines two entrances located at two ends of the sliding track respectively and communicating with the sliding track for allowing the corresponding connection portion to be inserted in the sliding track.

13. The support structure as claimed in claim 1, wherein the recess comprises a wall, and the connection holes and the connection slots are all defined in the wall.

14. The support structure as claimed in claim 13, wherein a plurality of functional holes is defined in the wall to correspond to jacks and dock connectors arranged in the side portion of the electronic device.

15. The support structure as claimed in claim 1, wherein a touching portion protrudes from the supporting member for driving the supporting member to rotate relative to the main body.

16. A support structure used for supporting an electronic device, the support structure comprising:
   a main body sleeved on a side portion of the electronic device; and
   a supporting member rotatably connected to the main body and being rotatable relative to the main body to form an included angle therebetween to support the electronic device;
   wherein the main body is frame shaped and corresponds to the side portion of the electronic device; the main body comprises a first body portion and a second body portion detachably connected to the first body portion; the first body portion comprises two first distal ends each of which defines a slot, the second body portion comprises two second distal ends corresponding to the first distal ends respectively, and two protrusions protrude from the second distal ends to be respectively received in the slots to connect the second body portion to the first body portion.

17. A support structure used for supporting an electronic device, the support structure comprising:
   a main body sleeved on a side portion of the electronic device; and
   a supporting member rotatably connected to the main body and being rotatable relative to the main body to form an included angle therebetween to support the electronic device;
   wherein the support structure further comprises an auto-control module used for automatically driving the supporting member to rotate relative to the main body; the auto-control module comprises a detecting unit disposed in the main body for detecting a touch from a user, a controlling unit disposed in the main body for generating different control signals according to the touch, and a driving unit disposed in the supporting member for driving the rotating rods to rotate in the connection slots respectively.

18. The support structure as claimed in claim 17, wherein the detecting unit comprises a plurality of detecting ports arranged in order, when each detecting port is touched, the detecting unit generates a corresponding detecting signal, and the controlling unit generates different control signals according to the relationship between the order of the detecting signals and the order that the detecting ports are arranged.

19. The support structure as claimed in claim 18, wherein when the order of the detecting signals is consistent with the order that the detecting ports are arranged, the controlling unit generates a first control signal, the driving unit receives the first control signal and drives the rotating rods to rotate in the connection slots along a first direction to open the supporting member; and when the order of the detecting signals is inconsistent with the order that the detecting ports are arranged, the controlling unit generates a second control signal, the rotating rods receives the second control signal and drives the rotating rods to rotate in the connection slots along a second direction opposite to the first direction to close the supporting member.

20. The support structure as claimed in claim 17, wherein the main body is frame shaped and corresponds to the side portion of the electronic device; the main body comprises a first body portion and a second body portion detachably connected to the first body portion; the first body portion comprises two first distal ends each of which defines a slot, the second body portion comprises two second distal ends corresponding to the first distal ends respectively, and two protrusions protrude from the second distal ends to be respectively received in the slots to connect the second body portion to the first body portion.

\* \* \* \* \*